United States Patent [19]

Wolfe, III

[11] 4,278,373
[45] Jul. 14, 1981

[54] INDEXABLE INSERT DRILL
[75] Inventor: John R. Wolfe, III, Fayetteville, Ark.
[73] Assignee: TRW Inc., Euclid, Ohio
[21] Appl. No.: 35,606
[22] Filed: May 3, 1979
[51] Int. Cl.$^3$ ............................................ B23B 51/00
[52] U.S. Cl. .................................... 408/188; 408/199; 407/114
[58] Field of Search ................. 408/188, 59, 197, 199, 408/226, 713, 157

[56] References Cited

U.S. PATENT DOCUMENTS

| 3,027,786 | 4/1962 | Severson | 408/197 |
|---|---|---|---|
| 3,816,018 | 6/1974 | Hlocky | 408/59 |
| 4,066,376 | 1/1978 | Eckle et al. | 407/103 |
| 4,072,438 | 2/1978 | Powers | 408/199 |
| 4,131,383 | 12/1978 | Powers | 407/114 |
| 4,149,821 | 4/1979 | Faber | 408/226 |

FOREIGN PATENT DOCUMENTS 2044012  5/1979  Fed. Rep. of Germany ........... 408/713

Primary Examiner—Leonidas Vlachos
Attorney, Agent, or Firm—Daniel G. Blackhurst

[57] ABSTRACT

An indexable insert drill particularly suited for use in machining soft metals such as aluminum or the like. The drill includes an elongated body having a drilling portion with at least one groove extending axially along a portion thereof from the drilling portion end. In one embodiment, a generally triangular cutting insert is fixedly mounted in a receiving pocket included in the groove so that in cutting presentment, the insert cutting edge extends radially of the drilling portion from an innermost end area at the drilling portion longitudinal axis to an outermost end area outwardly of the drilling portion side wall. The cutting insert is configured so that the cutting edge will have neutral lead, neutral radial rake and positive axial rake when the insert is mounted in the receiving pocket. The receiving pocket includes a back tapered side wall defining an insert retaining area for conveniently capturing a side of the cutting insert. In another embodiment, the body drilling portion includes a pair of grooves and a cutting insert associated with each in a manner such that the cutting edges are disposed diametrically across the body drilling portion in a radially and axially offset relationship. Preferably, the inserts used in both embodiment each have a pair of cutting edges which may be selectively placed in drilling presentment. When one of these cutting edges is in cutting presentment, the other is captured in and protected by the insert retaining area of the associated receiving pocket.

10 Claims, 10 Drawing Figures

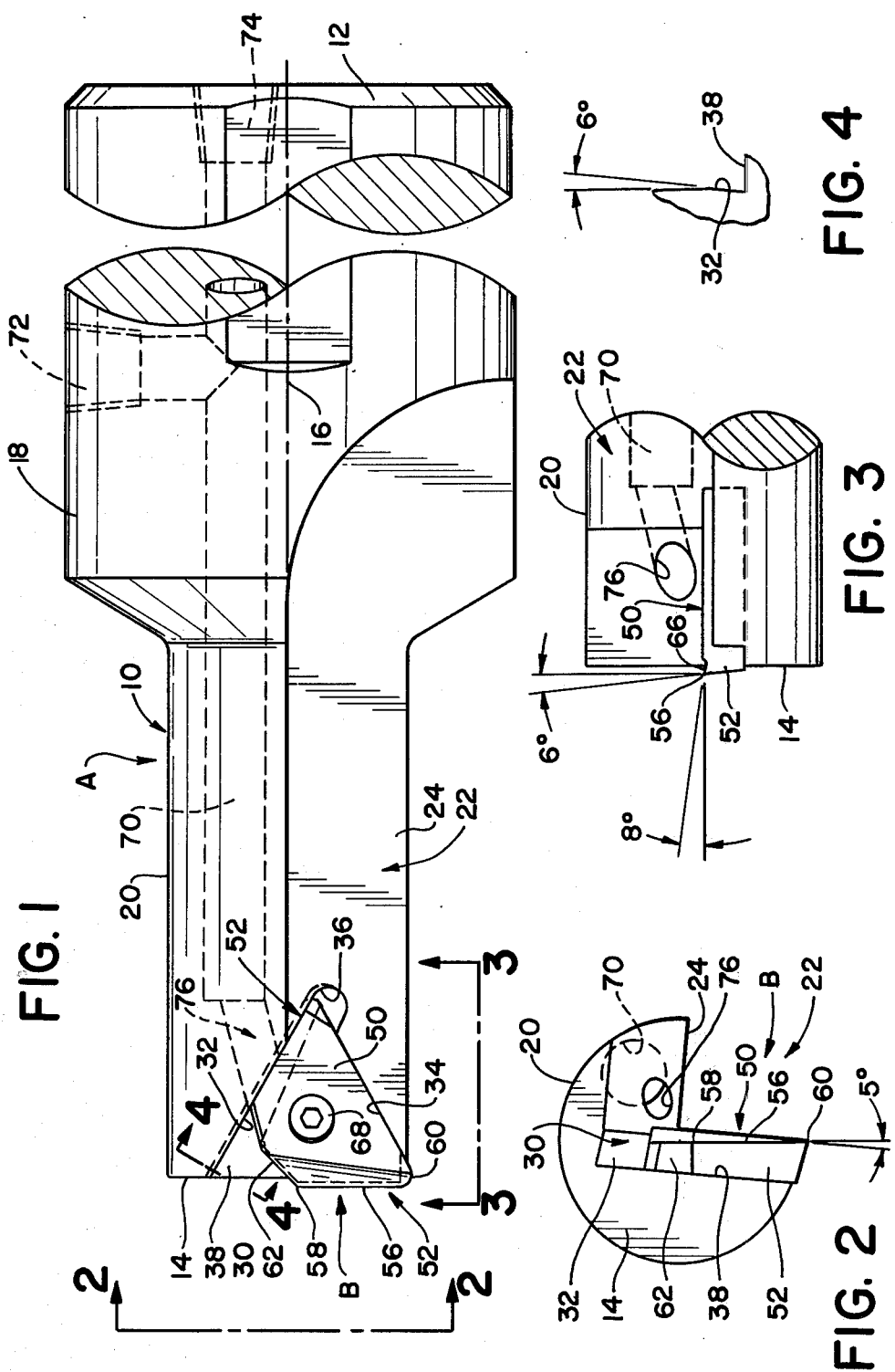

INDEXABLE INSERT DRILL

BACKGROUND OF THE INVENTION

This invention is directed to the art of metal removal or cutting tools and more particularly, to an indexable insert type drill.

There has recently been a substantial interest in drills having cutting edges defined by indexable and/or replaceable inserts formed from carbide and the like. Typical of some of the more recent innovations for such drills are the arrangements shown in the commonly assigned U.S. Pat. Nos. 4,072,438 and 4,131,383 to Powers.

In conjunction with these prior development efforts, it has been found desirable to develop an indexable insert drill particularly adapted for use in cutting soft metals such as aluminum or the like. At the same time, it has also been found desirable to provide such a drill with convenient means for fixedly retaining an insert in a drill body insert receiving pocket to provide greater insert stability during actual machining operations. In addition, it has been deemed advantageous to provide inserts which have at least two cutting edges so that when one cutting edge is worn or otherwise ineffective, the insert may simply be removed from the associated drill body, inverted or otherwise indexed and reinstalled with a new cutting edge disposed in cutting presentment. Along with this latter feature, it is considered advantageous to be able to provide means for protecting the second or alternate cutting edge from damage when it is in a stored or position of non-use.

The subject invention is deemed to meet the aforementioned needs and provides a new and improved indexable insert drill and insert which facilitates improved machining results for soft materials such as aluminum and the like when the drill is used in either the dynamic condition (drill rotating) or the static condition (work rotating).

BRIEF DESCRIPTION OF THE INVENTION

The subject invention provides an indexable insert type drill and insert which have been particularly successful at drilling from the solid of soft materials such as aluminum and the like in either the dynamic (drill rotating) or static (work rotating) conditions.

According to the present invention, the drill comprises an elongated generally cylindrical body having a longitudinal axis extending between the first and second terminal ends with a portion of the body adjacent the first end comprising a drilling portion. At least one groove extends axially of the body along at least a section of the drill portion to the first end and terminates in an insert receiving pocket. This insert receiving pocket includes at least one receiving pocket side wall which is undercut inwardly from the outermost edge thereof for defining an insert retaining area. A hard cutting insert having a generally triangular periphery is fixedly retained in the insert receiving pocket. This insert includes at least one cutting edge defined by first and second intersecting faces extending generally along an insert side and disposed to extend radially of the body from the longitudinal axis axially outward of the body first end with neutral radial and positive axial rake. The cutting insert is further disposed so that another side thereof is captured by the insert retaining area for providing greater insert stability during a drilling or machining operation.

In accordance with another aspect of the present invention, the insert is truncated at the corner-like area of intersection between the one and the other sides thereof. This truncated area is disposed at generally the body longitudinal axis when the insert is mounted to the drill body.

In accordance with another aspect of the present invention, the insert receiving pocket one side wall is defined by a reverse taper and the cutting insert another side is tapered in a manner which is substantially compatible or mates with the reverse taper of the receiving pocket one side wall.

In accordance with still another aspect of the present invention, the insert receiving pocket has a generally triangular configuration including a pair of side walls extending generally axially inward into the body from the body first end. The base of this receiving pocket is located at the body first end and is open axially thereof.

According to still a further aspect of the present invention, the at least one groove in the body drilling portion comprises a pair of grooves. Each groove, in turn, has a cutting insert receiving pocket for fixedly receiving a generally triangular cutting insert. Preferably, the cutting edge of one of these inserts extends radially from an innermost end at generally the body longitudinal axis to an outermost end disposed radially inward of the body drilling portion side wall. The cutting edge of the other insert extends radially from an innermost end intermediate the one cutting edge innermost and outermost ends to an outermost end spaced radially outward of the body drilling portion side wall. Both of these cutting edges extend axially outward of the body first end.

According to yet a further aspect of the present invention, the one cutting edge extends axially outward of the body first end a greater distance than the other cutting edge. Preferably, the two cutting edges are aligned with each other diametrically of the body first end.

In accordance with another aspect of the present invention, there is provided an indexable insert drill adapted to be selectively fixedly mounted to an elongated drilling body. The insert comprises a hard insert body having a generally triangular periphery with opposed first and second faces and peripheral sides. One of the sides includes a first cutting edge extending generally longitudinally thereof and defined by the intersection of first and second surfaces. The first surface comprises the insert one side and the second surface comprises a portion of the insert first face. This first cutting edge is defined in a manner such that it will have positive axial rake when the insert is fixedly mounted on a drill body with the first cutting edge selectively disposed in the desired drilling presentment position. Another of the insert sides includes a second cutting edge extending generally longitudinally thereof and defined by the intersection of third and fourth surfaces. The third surface comprises the insert another side and the fourth surface comprises a portion of the insert second face. This second cutting edge is defined in a manner such that it will have positive axial rake when the insert is fixedly mounted on a drill body with the second cutting edge selectively disposed in the desired presentment position. The apex area between the one and the another insert sides is chamfered relative to each of the one and the another insert sides.

According to a further aspect of the present invention, the first and second cutting edges comprise mirror images of each other so that the insert must be inverted when one of the cutting edges is to be placed in cutting presentment in place of the other.

The principal object of the present invention is the provision of a new and improved indexable insert drill and insert which are particularly designed to provide positive cutting geometry for drilling from the solid in a variety of soft metals.

Another object of the present invention is the provision of a new and improved indexable insert drill and insert which may be used for many different machining operations in processing soft metals over a broad range of drill diameters.

A further object of the present invention is the provision of a new and improved indexable insert drill and insert which facilitate increased cutting insert stability.

Yet another object of the present invention is the provision of a new and improved indexable insert drill and insert which provides protection for an unused alternate insert cutting edge.

Still other objects and advantages to the present invention will become readily apparent to those skilled in the art upon a reading and understanding of the following specification.

BRIEF DESCRIPTION OF THE DRAWINGS

The invention may take physical form in certain parts and arrangements of parts, a preferred and alternative embodiments of which will be described in detail in this specification and illustrated in the accompanying drawings which form a part hereof and wherein:

FIG. 1 is a side elevational view of an indexable insert drill constructed in accordance with the subject invention;

FIG. 2 is a view taken along lines 2—2 of FIG. 1;

FIG. 3 is a view taken along lines 3—3 of FIG. 1;

FIG. 4 is a view taken along lines 4—4 of FIG. 1 for showing the insert receiving pocket retaining area and with the insert removed for ease of illustration;

DESCRIPTION OF THE PREFERRED AND AN ALTERNATIVE EMBODIMENT

Figure 6:
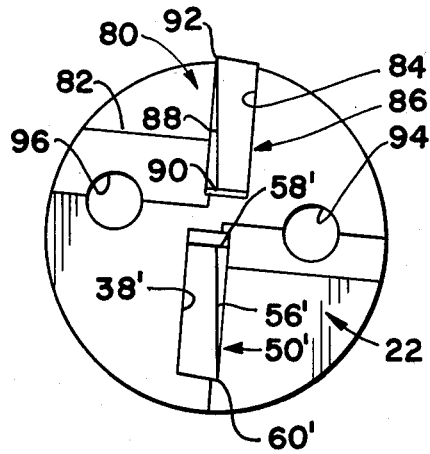
FIG. 6 is a view taken along lines 6—6 of FIG. 5.

Referring now to the drawings wherein the showings are for purposes of illustrating the preferred and an alternative embodiment of the invention only and not for purposes of limiting same, FIGS. 1-4 show an indexable insert drill comprised of a drill body A and an indexable cutting insert B.

More particularly, drill body A is comprised of a main body 10 having opposed ends 12,14 with a body longitudinal axis 16 extending between these ends. The area of the main body adjacent end 12 comprises a mounting end portion 18 and the area adjacent end 14 comprises a drill or cutting end portion 20. Main body 10 has a generally cylindrical configuration and is formed from steel or any other suitable material capable of providing the required strength and rigidity. Extending axially inward of the body from end 14 along drill or cutting end portion 20 is a recess or groove 22 which defines a single, straight flute 24. As best shown in FIG. 2, groove 22 has a generally V-shaped cross-section in planes perpendicular to body longitudinal axis 16. In addition, flute 24 extends radially into drill or cutting end portion 20 a distance at least substantially equal to the radius of the cutting end portion.

Disposed at the end of groove 22 adjacent main body end 14 is a generally triangular cutting insert receiving pocket 30. This pocket includes a pair of side walls 32,34 diverging from an axial innermost apex 36 to end 14 and further includes a bottom wall 38. End 14 defines an open leg or base area for receiving pocket 30. As best shown in FIG. 4, side wall 32 back tapers over the length thereof from the outermost edge toward bottom wall 38. This back taper defines an insert retaining area as will be more fully discussed hereinafter. Although it would be possible to utilize a variety of specific taper angles, side wall 32 is back tapered approximately 6° to closely mate with and retainingly engage indexable insert B as will also become more readily apparent hereinafter.

Indexable insert B is comprised of an insert body generally designated 50 which is constructed from a hard, cutting material such as tungsten carbide or the like. This insert body has a generally triangular periphery including adjacent sides 52,54. Side 52 includes a cutting edge 56 extending generally longitudinally thereover with an innermost end area 58 adjacent longitudinal axis 16 and an outermost end area 60 spaced radially outward of the drill or cutting end portion 20 side wall. Innermost end area 58 is chamfered as at 62 to prevent insert breakage or failure at that area since the effective cutting speed at longitudinal axis 16 will approach zero. In addition, outermost end area 60 is conveniently radiused.

Cutting edge 56 is defined by the intersection of insert side 52 and a top surface area 66. Surface area 66 tapers from the cutting edge inwardly into the insert body and the insert itself is positioned on the drill body so that cutting edge 56 has positive axial rake. While a number of different rake angles could be employed, the preferred embodiment here under discussion contemplates a high positive rake on the order of magnitude of 8°. A positive axial rake angle is deemed important in the environment to which the subject invention is particularly directed, i.e., machining soft metals such as aluminum and the like. As best shown in FIG. 2, cutting edge 56 lies exactly on a radius of drill or cutting end portion 20 to thereby have effective neutral radial rake. As will also be there noted, insert body 50 is contoured or positioned so as to provide back clearance behind outermost end area 60 of cutting edge 56.

Referring particularly to FIGS. 1 and 3, insert body 50 is contoured and/or located such that cutting edge 56 has or provides the drill with a neutral lead. That is, the cutting edge extends axially outward of body 14 an equal amount over the longitudinal extent thereof. In addition, the maximum radial extend of cutting edge 56 is slightly greater than the maximum radial extent of drill or cutting end portion 20. Thus, and as shown in FIG. 1, outermost end area 60 provides clearance for drill or cutting end portion 20. This clearance should be kept to a minimum to prevent chips from packing between the cutting end portion and the wall of a hole being machined when the tool is utilized as a drill.

Mechanical fastening means such as screw 68 is employed to rigidly affix insert body 50 to the drill or cutting end portion of drill body A. In the position shown in FIG. 1, insert body side 54 is captured and retained in the retaining area defined by receiving pocket side wall 32. Moreover, the third side of the generally triangular insert closely engages receiving pocket side wall 34. During drilling or other machining operations, this overall arrangement greatly assists in enhancing insert stability and in reducing stress applied to screw 68. As will be described hereinafter, a second or alternate cutting edge may be included on the insert body with this second cutting edge being received in and protected by the insert receiving pocket retaining area.

A cutting fluid passageway generally designated 70 extends generally axially of drill body A. A generally radial coolant inlet port 72 communicates with passageway 70 in mounting end portion 18 and a generally axial inlet port 74 communicates therewith at body end 12. Fluid passageway 70 terminates at an outlet port 76 which is disposed in groove 22 closely adjacent cutting edge 56. Either of inlet ports 72,74 can be used for coolant supply depending upon the type of machine on which the drill is mounted. The non-used port is, of course, merely plugged. Outlet port 76 is angled as best shown in FIGS. 2 and 3 for directing coolant flow generally toward the radial innermost end area 58 of the cutting edge. Preferably, coolant is supplied at a comparatively high pressure to assist in moving chips away from the area of drilling or machining in a workpiece.

It has been found that the above described structural relationships provide an indexable insert drill which is effective in machining soft materials such as aluminum and the like when the drill is used in either the dynamic (tool rotating) or static (work rotating) conditions. Moreover, and while the tool is particularly useful in drilling a hole from the solid in such soft materials, the overall structural relationships permit the drill to be used for a variety of other machining operations, including turning, facing and contouring. A more detailed description regarding use of an indexable insert drill for such operations is found in the commonly assigned U.S. Pat. Nos. 4,072,438 and 4,131,383 to Powers, the teachings of which are incorporated hereinto by reference. The ability of the subject drill to perform a variety of metal removal or drilling operations is particularly advantageous since it facilitates a plurality of stock removal functions to be carried out at a single work station without a tooling or machine station change. It should also be noted that all machining cuts are performed with a single insert.

Figure 5:
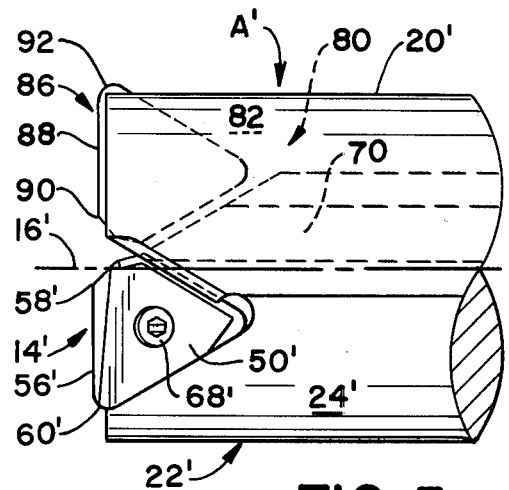
FIG. 5 is a side elevational view of an alternative indexable insert drill structure constructed in accordance with the subject invention.

Referring now to FIGS. 5 and 6, there is shown a modification of the basic construction described hereinabove with reference to FIGS. 1-4. For ease of illustration in appreciating this modification, like components are identified by like numerals with a primed (') suffix and new components are identified by new numerals. The tool shown in FIGS. 5 and 6 has a pair of grooves 22',80 extending inwardly into drill or cutting end portion 20' from drill body end 14'. Each of grooves 22',80 defines an elongates straight flute 24',82 and includes a triangular receiving pocket previously described. Bottom walls 38',84 of these two receiving pockets are shown in FIG. 6.

Insert body 50' is associated with groove 22' such that cutting edge 56' thereof extends radially of cutting end portion 20' axially from drill body end 14'. The innermost end area 58' of this cutting edge is disposed at generally tool body longitudinal axis 16' with outermost end area 60' disposed slightly inwardly of the cutting end portion 20' side wall. Insert body 86 has a cutting edge 88 which similarly extends radially of cutting end portion 20' from inset innermost end area 90 to outermost end area 92 axially outward of main body end 14'. Innermost end area 90 is disposed intermediate ends 58',60' of cutting edge 56' and outermost end 92 is disposed slightly radially outward of the cutting end portion 20' side wall. The position of outermost end area 92 radially outward of cutting end portion 20' provides clearance for the cutting end portion. This clearance should be kept to a minimum to prevent chips from packing between the cutting end portion and the wall of a hole being machined when the tool is being used as a drill. In the embodiment here under discussion, insert bodies 50',86 are identical to each other although it may be desirable in some circumstances to have the drill accommodate insert bodies of different sizes.

With particular reference to FIG. 5, it will be seen that both cutting edges 56',88 have a neutral lead, that is, each extends outwardly from end 14' the same distance over the respective lengths thereof between ends 58',60' and 90,92. It should also be noted that cutting edge 56' extends slightly further axially outward of end 14' than cutting edge 88. In FIG. 6, it will be noted that cutting edges 56',88 extend diametrically across end 14' in alignment with each other to have effective neutral radial rake. Moreover, the cutting edges are each configured and/or positioned to have high positive axial rake. A positive rake of approximately 8° is generally preferred for use in machining or drilling soft metals.

In using the structural arrangement of FIGS. 5 and 6 in, for example, drilling a hole in solid material, cutting edge 56' will be the first to engage the material or workpiece and such engagement takes place radially inward of the maximum tool diameter. This then permits the drill be to be engaged with and guided by the workpiece prior to engagement at the drill outer diameter. Moreover, and because of the relative radial spacing of cutting edges 56',86, forces acting on the drill body during a drilling operation are equalized to improve the cutting or drilling dynamics and reduce the tendency for the drill to deflect. Of course, each of inserts 56,88' is captured in an insert retaining area defined by a side wall of the associated insert receiving pocket in the same manner as previously described. This provides still greater insert stability during drill use and lowers the stress applied to the mechanical fastening means employed to fixedly secure the inserts to tool body A'. Typical fastening means comprise screws with one such screw designated 68' in FIG. 5 as used in conjunction with insert body 50'.

FIGS. 7-10 show a typical insert configuration for use with the drill embodiments described hereinabove. With reference to these FIGURES, the insert is comprised of a solid, unitary insert body 100 of any hard material suitable for cutting tools such as tungsten carbide or the like. The insert has a generally truncated triangular periphery comprised of a pair of opposed, spaced apart faces 102,104 and sides 106,108,110. These sides merge into apex areas generally designated 112,114 and 116. A centrally located mounting opening 118 communicates between faces 102,104 and is countersunk at the areas thereof adjacent each face.

A first cutting edge 120 extends generally longitudinally of insert side 106 and a second cutting edge 122 extends generally longitudinally of insert side 108. Apex area 112 is at the truncated end of the insert body and is itself comprised of a planar chamfered area 124 extending from insert side 106 and a planar chamfered area 126 extending from insert side 108 with areas 124,126 intersecting at point or area 128. First cutting edge 120 is defined by the intersection of insert side 106 and a surface 130 (FIGS. 7 and 8) which comprises a portion of face 102. Second cutting edge 122 is defined by the intersection of insert side 108 and a surface 132 (FIGS. 7 and 9) which comprises a portion of face 104. As will best be seen by comparing FIGS. 7, 8 and 9, cutting edges 120,122 are mirror images of each other and allow the insert body to be inverted for purposes of placing one of the cutting edges in desired cutting presentment in place of the other cutting edge.

Figure 10:
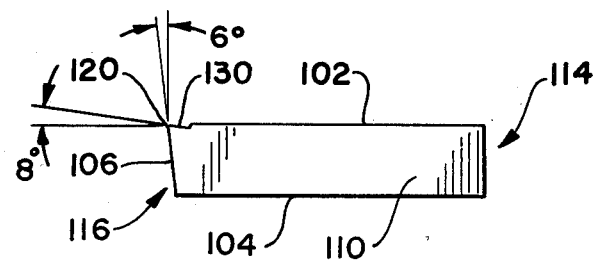
FIG. 10 is a view taken along lines 10—10 of FIG. 7.

In FIG. 10, surface 130 is shown as tapering from cutting edge 120 inwardly into the insert body toward face 104. This provides the cutting edge with a positive aixal rake when installed on a drill body in a manner previously described. While the amount of taper may vary, an angle of approximately 8° is preferred for purposes of providing the insert with 8° of positive axial rake at installation. Surface 130 merges into face 102 by means of a curved area spaced inwardly therealong from cutting edge 120. Surface 132 associated with cutting edge 122 has a similar tapered relationship relative from the cutting edge toward face 102 and a similar curved area for merging into face 104. With continued reference to FIG. 10, insert side 106 tapers inwardly into the insert from cutting edge 120 toward face 104 at a preferred angle of 6°. Although not shown, insert side 108 has a similar tapered relationship between cutting edge 122 and face 102. Still further, chamfered area 124 has a taper compatible with insert side 106 and a chamfered area 126 has a taper compatible with insert side 108.

Figure 8:
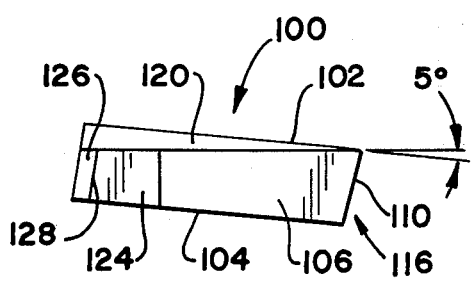
FIG. 8 is a view taken along lines 8—8 of FIG. 7.
Figure 7:
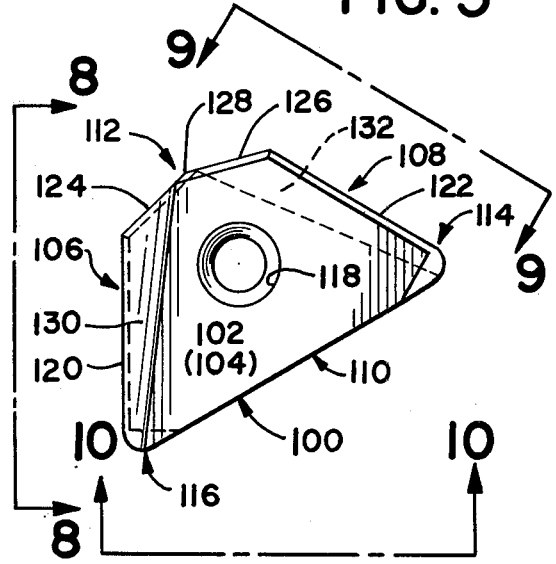
FIG. 7 is a plan view of an indexable insert of the subject invention.
Figure 9:
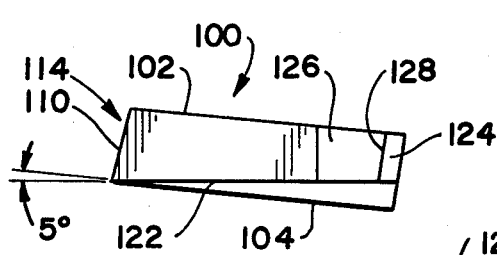
FIG. 9 is a view taken along lines 9—9 of FIG. 7.

With particular reference to FIG. 8, cutting edge 120 tapers over the longitudinal extent thereof toward face 104 from apex area 116 through chamfered area 124. As shown in FIG. 9, cutting edge 122 similarly tapers toward face 102 from apex area 114 through chamfered area 126. While the amount of such taper may be varied to accommodate the desired insert mounting, taper angles of approximately 5° are preferred. This allows the cutting edges to have effective neutral radial rake when mounted on a drill body in the manners shown in FIGS. 2 and 6. Apex areas 114,116 define the outermost radial ends of cutting edges 122,120, respectively, when these cutting edges are disposed in cutting presentment. These apex areas are advantageously radiused slightly as shown in FIG. 7. Such radiused configurations provide improved cutting action for drilling when the associated cutting edge is functioning as a single point type tool. Moreover, insert side 110 is tapered somewhat (FIGS. 8 and 9) to provide back clearance for both of cutting edges 120,122.

The areas of cutting edges 120,122 included at chamfered areas 124,126, respectively, define the innermost cutting edge ends as hereinabove described. Since these areas are disposed adjacent the tool longitudinal axis when the associated cutting edge is positioned in cutting presentment, the chamfered areas provide a better distribution of forces acting on the corner or apex area. This, in turn, reduces the possibility of failure of the cutting edges at these areas. The possibility of such failure is increased since, in use, the cutting speed at the tool body longitudinal axis approaches zero surface feet per minute. While any number of chamfer angles could be advantageously employed, chamfered area 124 is angularly disposed relative to insert side 106 and chamfered area 126 in angularly disposed relative to insert side 108 at angles in the range of from 30° to 60°. However, 45° for each of areas 124,126 is preferred.

While it is apparent that many different insert configurations could be utilized for obtaining the particular relationships previously described with reference to FIGS. 1-6, the cutting insert configuration particularly described with reference to FIGS. 7-10 is preferred. Because of the design, it is possible to have the insert provide two separately useable cutting edges. One of the cutting edges is retained in and protected from damage by a retaining area included in the drill body while the other cutting edge is disposed in cutting presentment. One such retaining area is identified by numeral 32 in FIGS. 1, 2 and 4 and comprises a tapered side wall of an insert receiving pocket. Preferably, the side of the insert retained by side wall 32 and side wall 32 itself have compatible or mating tapers. In the subject invention, the insert sides and side wall 32 have identical tapers of approximately 6°. When it is desired to move one of cutting edges 120,122 into cutting presentment in place of the other cutting edge, it is simply necessary to remove the insert from the cutting tool, invert it and then reinstall it on the tool.

The invention has been described with reference to the preferred and an alternative embodiment. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. An indexable insert drill comprising:
    an elongated generally cylindrical body having a longitudinal axis extending between first and second terminal ends with a portion of said body adjacent said first end comprising a drilling portion; at least one groove extending axially of said body along at least a section of said drilling portion and terminating in an insert receiving pocket at said first end, said insert receiving pocket having a generally triangular configuration with a pair of side walls extending generally axially inward into said body from said first end, the base of said receiving pocket being open at said first end, the radial innermost side wall of said insert receiving pocket defined by a reverse taper to provide an undercut inwardly from the outermost edge thereof for defining an insert receiving area; and
    a hard cutting insert having opposite generally parallel faces and a generally triangular periphery defined by connecting sides and fixedly retained in said insert receiving pocket, said cutting insert including at least first and second cutting edges extending generally along said opposite faces thereof and each being defined by first and second intersecting surfaces with the first cutting edge disposed to extend radially of said body from said longitudinal axis axially outward of said body first end with neutral radial and positive axial rake, said cutting insert being further configured and disposed so that another side thereof is tapered in a manner substantially compatable with said reverse taper of the radial innermost sidewall to be captured by said insert retaining area for protecting said second cutting edge and providing greater insert stability during a drilling operation.

2. The drill as defined in claim 1 wherein said insert is truncated at the area of intersection between said one and said other sides thereof, said truncated area being disposed at generally the area of said body longitudinal axis.

3. The drill as defined in claim 2 wherein the radial outermost end of said cutting edge is slightly radiused.

4. The drill as defined in claim 1 wherein said cutting insert is disposed to engage both side walls of said receiving pocket.

5. The drill as defined in claim 1 wherein said cutting edge extends radially outward of the body drilling portion side wall, the radial innermost end area of said cutting edge adjacent said body longitudinal axis being chamfered so as to extend generally axially inward into said body for providing better force distribution thereat during drill operation and wherein the radial outermost end area of said cutting edge includes a radius.

6. The drill as defined in claim 1 wherein said at least one groove comprises a pair of grooves with each having one of said cutting insert receiving pockets and a generally triangular cutting insert disposed therein, each of said inserts being disposed so that a side thereof is captured by the retaining area of the associated receiving pocket.

7. The drill as defined in claim 6 wherein each of said inserts includes at least one cutting edge defined by first and second intersecting surfaces, one of said cutting edges extending radially from an innermost end at said body longitudinal axis to an outermost end disposed radially inward of the body drilling portion side wall with the other of said cutting edges extending radially from an innermost end intermediate said one cutting edge innermost and outermost end to an outermost end spaced radially outward of said body drilling portion side wall, both of said cutting edges extending axially outward of said body drilling portion.

8. The drill as defined in claim 7 wherein said one cutting edge extends axially outward from said body first end a greater distance than said other cutting edge.

9. The drill as defined in claim 8 wherein said cutting edges are diametrically aligned across said body drilling portion.

10. The drill as defined in claim 7 wherein said pair of cutting edges each have neutral lead.

* * * * *